(12) United States Patent
Derbowka

(10) Patent No.: US 10,906,366 B2
(45) Date of Patent: Feb. 2, 2021

(54) TIRE SPREADER

(71) Applicant: Graham Harry Derbowka, Borden (CA)

(72) Inventor: Graham Harry Derbowka, Borden (CA)

(*) Notice: Subject to any disclaimer, the term of this patent is extended or adjusted under 35 U.S.C. 154(b) by 464 days.

(21) Appl. No.: 15/973,953

(22) Filed: May 8, 2018

(65) Prior Publication Data

US 2018/0370304 A1     Dec. 27, 2018

(30) Foreign Application Priority Data

Jun. 21, 2017     (CA) ...................................... 2971318

(51) Int. Cl.
| | | |
|---|---|---|
| B66F 15/00 | (2006.01) | |
| B60C 25/14 | (2006.01) | |
| B60C 25/00 | (2006.01) | |

(52) U.S. Cl.
CPC .......... B60C 25/142 (2013.01); *B60C 25/005* (2013.01)

(58) Field of Classification Search
CPC ..... B66F 15/00; B60C 25/00; B60C 25/0521; B60C 25/0503
See application file for complete search history.

(56) References Cited

U.S. PATENT DOCUMENTS

| | | | | |
|---|---|---|---|---|
| 1,367,446 A * | 2/1921 | Witham | ................ | B60C 25/142 254/50.1 |
| 1,445,343 A * | 2/1923 | Miller | ................... | B60C 25/142 254/50.1 |
| 1,776,037 A * | 9/1930 | Leavitt | .................. | B60C 25/142 254/50.4 |
| 1,815,764 A * | 7/1931 | Edelmann | ............. | B60C 25/142 254/50.1 |
| 2,042,312 A * | 5/1936 | Huebner | ............... | B60C 25/142 254/50.1 |
| 2,044,681 A * | 6/1936 | Griffith | ................. | B60C 25/142 254/50.1 |
| 2,474,515 A * | 6/1949 | Cox | ........................ | B60C 25/02 254/50.1 |
| 2,560,101 A * | 7/1951 | Guillemette | .......... | B60C 25/142 254/50.1 |
| 2,642,264 A * | 6/1953 | Perry | .................... | B60C 25/142 254/50.1 |
| 2018/0370304 A1* | 12/2018 | Derbowka | ............ | B60C 25/142 |
| 2019/0210414 A1* | 7/2019 | Gramling | ............ | B60C 25/0548 |

* cited by examiner

*Primary Examiner* — Lee D Wilson
(74) *Attorney, Agent, or Firm* — Ryan W. Dupuis; Ade & Company Inc.; Kyle R. Satterthwaite

(57) ABSTRACT

A tire spreader has a pair of tire engaging members pivotally interconnected at a coupling location, each supporting a tire engaging element for contacting a sidewall of a tire. The tire engaging members can be pivotally actuated relative to one another from a neutral position, in which the sidewalls are spaced apart at a regular spacing, to a self-retaining spreading position in which the tire engaging elements are spaced further apart than in the neutral position so as to spread the sidewalls further apart from their regular spacing. First and second pivotally interconnected links are provided, with one of the links connected to the first tire engaging member between the coupling location and the tire engaging element of this first member, while the other one of the links is connected to the second engaging member spaced from the coupling location in a direction distal to the tire engaging element thereof.

7 Claims, 1 Drawing Sheet

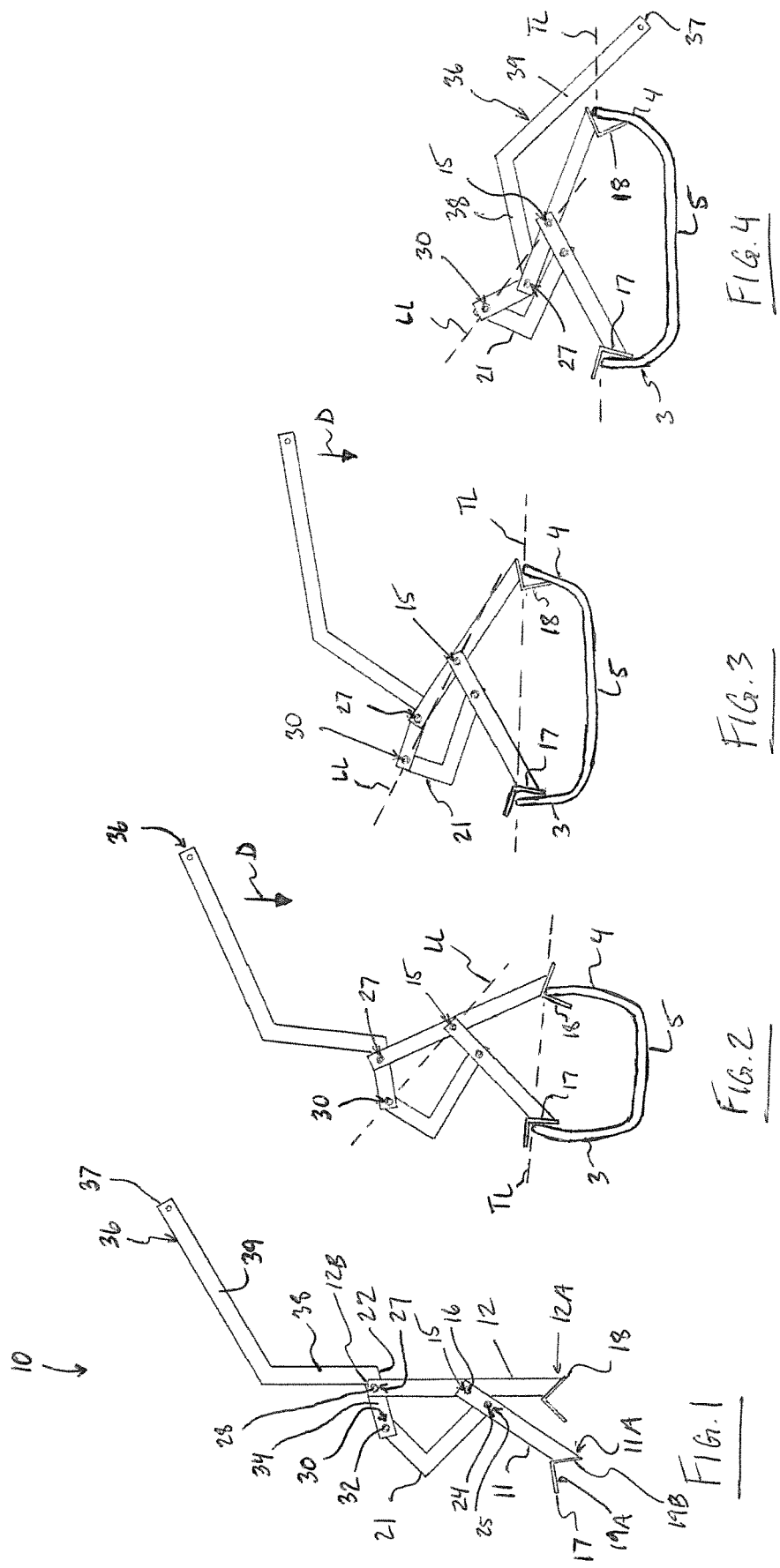

TIRE SPREADER

This application claims foreign priority benefits from Canadian Patent Application 2,971,318, filed Jun. 21, 2017.

FIELD OF THE INVENTION

The present invention relates to tire spreaders, that is, devices for spreading apart sidewalls of a tire.

BACKGROUND

Tire spreaders are used to spread apart sidewalls of a tire when the tire is not installed on a rim. Typically, a tire spreader is employed in order to gain better access to an inside of a tread of the tire, for example for patching a puncture in the tread from the inside or interior of the tire.

SUMMARY OF THE INVENTION

According to an aspect of the invention there is provided a tire spreader for use with a tire having sidewalls on opposite sides of a tread, the tire spreader comprising:

a first tire engaging member and a second tire engaging member each supporting a tire engaging element for contacting a respective one of the sidewalls;

the first and second tire engaging members being pivotally connected to one another at a coupling location so that the tire engaging members can pivot relative to one another from a neutral position, in which the sidewalls are spaced apart at a regular spacing, to a spreading position in which the tire engaging elements are spaced further apart than in the neutral position so as to spread the sidewalls further apart from their regular spacing;

a first link pivotally connected to the first tire engaging member at an intermediate link location between the tire engaging element thereof and the coupling location;

a second link pivotally connected to the second tire engaging member at a distal link location spaced from the coupling location in a direction distal to the tire engaging element of the second tire engaging member;

the second link also being pivotally connected to the first link at a link interconnection location spaced from the intermediate link location where the first link is pivotally connected to the first tire engaging member;

the second link forming a handle for operating the tire spreader such that upon displacement thereof the distal link location passes from a position on one side of an imaginary line joining the link interconnection location and the coupling location, in the neutral position, to a position on an opposite side with respect to the imaginary line such that the first and second tire engaging members are in the spreading position.

In an embodiment, the distal link location is arranged so as to follow a path between the link interconnection location and the coupling location from the neutral position to the spreading position.

In an embodiment, the first link is arranged to prevent the distal link location, when on the opposite side of the imaginary line, from further movement away from the imaginary line so as to retain the first and second tire engaging members in the spreading position.

In an embodiment, the first link follows a non-linear path from the intermediate link location to the link interconnection location deflecting away from the imaginary line.

Preferably, in the neutral position, the handle extends from a portion of the second link which is between the link interconnection location and the distal link location in a direction away from an imaginary line joining the tire engaging elements.

Preferably the handle follows a non-linear path from a portion of the second link, which is between the link interconnection location and the distal link location, to a free end of the handle such that, in the spreading position, the handle crosses an imaginary line joining the tire engaging elements from one side thereof on which pivotal connections of the tire spreader are located to the free end of the handle on the other side of the imaginary line.

In an embodiment, the second tire engaging member terminates at one end at the distal link location.

BRIEF DESCRIPTION OF THE DRAWINGS

An embodiment of the invention will now be described in conjunction with the accompanying drawings in which:

FIG. 1 illustrates in side elevational view a tire spreader according to the present invention.

FIG. 2 is another side elevational view of the tire spreader of FIG. 1 in which tire engaging elements are spaced further apart acting to spread the sidewalls apart, arranged in a neutral position suited for inserting between sidewalls of a tire in their regular spacing. Only a portion of the tire, which is schematically shown, is illustrated for convenience and clarity of illustration.

FIG. 3 is yet another side elevational view of the tire spreader of FIG. 1 in which the tire engaging elements are near a maximum width for spreading the sidewalls apart.

FIG. 4 is a further side elevational view of the tire spreader of FIG. 1 arranged in a retained spreading position.

In the drawings like characters of reference indicate corresponding parts in the different figures.

DETAILED DESCRIPTION

There is shown in the figures a tire spreader 10 for use with a tire 1 (schematically shown) having sidewalls 3 and 4 on opposite sides of a tread 5.

The tire spreader 10 comprises first and second tire engaging members 11 and 12 in the form of linearly extending bars which are pivotally connected together at a member coupling location 15 defined by pivot pin 16. Each tire engaging member supports at one of its ends 11A, 12A a tire engaging element 17, 18 in the form of an angle iron having opposite walls 19A and 19B oriented perpendicularly transversely to the bar and interconnected so that the tire engaging element receives between its opposite walls an edge of the respective tire sidewall. Thus, the tire engaging elements 17, 18 contact a respective one of the sidewalls at an inner surface thereof and wraps around an inner peripheral edge of the sidewall.

Additionally, the tire spreader 10 includes first and second links 21 and 22 which are operatively coupled to the tire engaging members 11, 12 for actuating spreading action of the tire spreader, that is for enabling movement of the tire engaging elements 17, 18 apart from one another so as to spread apart the tire sidewalls for gaining less obstructed access to an inside surface of the tire tread, as compared to the access available when the tire sidewalls are at their regular spacing.

More specifically, the first link 21 which is bent and L-shaped is pivotally connected to the first tire engaging member 11 at a pivot pin 24 defining an intermediate link actuating location 25 which is intermediate the coupling location 15 and the tire engaging element 17 supported on the end 11A first tire engaging member, and spaced from each. That is, at the intermediate link location 25, the first link 21 actuates pivotal movement of the first tire engaging member 17 relative to the other tire engaging member.

The second link 22 is pivotally connected to the second tire engaging member 12 at a distal link actuating location 27 defined by pivot pin 28, which is spaced from the coupling location 15 in a direction along the second tire engaging member that is distal to the tire engaging element 18 supported thereon. That is, the distal link location 27 is on an opposite side of the coupling location 15 with respect to the tire engaging element 18 of the second tire engaging member 12. It is at the distal link location 27 that the second link 22 actuates pivotal movement of the second tire engaging member 18 relative to the other tire engaging member. In the illustrated embodiment, the second tire engaging member 12 terminates at an opposite end 12B to the tire engaging element 18 at the distal link location 27.

Furthermore, the first and second links 21, 22 are pivotally interconnected at a link interconnection location 30 defined by pivot pin 32, which is spaced from each of the link actuating locations 25 and 27. In the illustrated embodiment, the second link 22 comprises a linear portion 34 extending linearly between the link interconnection location 30 and the distal link location 27, whereat the second link connects to the second tire engaging member 12.

The second link forms a handle 36 which extends from the linear portion 34 so as to follow a non-linear bent path to a free end 37 which is located to the side of the spreader device 10 on which the second tire engaging member 12 is located. More specifically, the handle extends in a direction away from the both the second tire engaging member 12 and the first link 21, almost perpendicularly transversely to the linear portion 34, so as to form a second linear portion 38 of the second link and then a third linear portion 39, defining the handle free end 37, which is transverse to the second linear portion and continues to extend away from the distal link location 27 and also from the link interconnection location 30.

In use, the handle 36 for operating the tire spreader initially extends in a direction away from an imaginary line TL joining the tire engaging elements 17, 18 when the tire spreader is arranged in a neutral position shown for example in FIG. 2. In the neutral position the tire spreader is arranged suitably for inserting the tire spreader 10 between the tire side walls at their regular spacing, that is, whatever spacing is found between the side walls 3, 4 in an unmounted condition of the tire (i.e., not mounted on a wheel rim).

Upon displacement of the handle 36 from its position in the neutral position of the spreader device and in a downward direction indicated by arrow D toward the tread of the tire, the first and second links 21, 22 cooperate to pivot the tire engaging members 11 and 12 such that the tire engaging elements 17, 18 which are in contact with the tire sidewalls move away from one another so as to become further spaced apart. In doing so, the tire spreader is thus arranged in a spreading position in which the sidewalls 3 and 4 are spread further apart from their regular spacing.

In movement from the neutral position to the spreading position, the distal link location 27 passes from an unlocked condition of the tire spreader in which the pivot pin 28 is located on one side of an imaginary line LL joining the link interconnection location 30 location and the coupling location 15, in a path between the link interconnection location 30 and the coupling location 15 to a position on an opposite side with respect to the imaginary line LL such that the tire engaging members 11, 12 are in the spreading position. This may be better appreciated with reference to the series of FIGS. 2 through 4, where FIG. 2 shows the tire spreader in the neutral position and in the unlocked condition, in FIG. 3 the tire spreader is still in the unlocked condition, and FIG. 4 shows the tire spreader in the spreading position. The tire engaging members 11, 12 are retained in the spreading position as they are prevented from moving further away from the imaginary line LL by the first link 21, against which the tire spreader at the distal link location 27 rests in the self-retained or locked spreading position. Depending on the tire, the handle 36 may also contact the sidewall of the tire in the spreading position and thus act as a stop for retaining the tire spreader in the spreading position.

That is, in the unlocked condition, natural biasing of the tire acting to keep the sidewalls at their regular natural spacing and which opposes the spreading of the tire engaging elements from one another will urge the link interconnection point 30 and the coupling location 15 together, towards one another, such that if insufficient force is applied to the handle 36 the distal link location 27 will deflect away from the imaginary line LL. On the other hand, in the locked condition, the distal link location 27 is obstructed by the first link 21 from continuing to move away from the imaginary line LL which would otherwise occur by the natural resiliency of the sidewalls urging the tire engaging elements together that remains present throughout operation of the tire spreader. This is because in either one of the unlocked or locked/retained conditions the distal link location 27 is not disposed on the imaginary line LL so as to be collinear with the link interconnection location and the coupling location, but rather the distal link location is located to one side of this line. The first link 21 therefore acts as a stop to maintain the tire spreader in the spreading position under the resiliency of the tire sidewalls. Furthermore, and consequently, the spacing between the sidewalls 3, 4 provided by the tire spreader in the self-retaining spreading position is slightly less than a maximum possible spreading width between the sidewalls, which is achieved when the distal link location 27 is collinear with the coupling location 15 and the link pivot connection 30.

Generally speaking, when the distal link location 27 is on a starting side of the imaginary line LL, as for example in FIG. 2, where location 27 is further from the tire engaging elements 17, 18 or their imaginary line TL, the natural resiliency of the tire sidewalls 3, 4 acts to urge the distal link location back towards a starting neutral position of the tire spreader in which the handle 36 extends away from the imaginary line TL. When the distal link location 27 cross the imaginary line LL the natural resiliency of the tire sidewalls acts to urge the distal link location away from the starting neutral position of the tire spreader.

Only by application of force to the handle 36 in a direction to pull the distal link location 27 away from the first link 21 and so as to cross the imaginary line LL back to the starting side does the tire spreader return to the neutral position.

It will be appreciated that, in the illustrated embodiment, the distance travelled by the distal link location 27 in its movement from one side of the imaginary line LL to the line itself, which defines the cross-over point or over-center position from the unlocked condition to the locked condition, is much smaller for the locked condition, in which the distal link location 27 is disposed between the first link 21 and the imaginary line LL, as compared to the unlocked condition in which movement of the distal link location 27 is not intentionally obstructed so as to limit movement thereof. As such, the distance between the tire engaging elements 17, 18 in the locked condition is near the maximum possible spreading width achievable by the tire spreader.

It will also be appreciated that the first link follows its non-linear path, which in the illustrated embodiment is an L-shaped path, such that the first link deflects away from the imaginary line LL, granting some clearance to the distal link location 27 to cross this line but not so much as to lose sidewall spacing width in the self-retaining spreading condition.

In the spreading position, the handle 36 crosses the imaginary line TL joining the tire engagement elements 17, 18 such that a portion of the handle is located above the imaginary line TL on one side thereof where the pivotal connections (defining the pivot points) of the tire spreader are located, to the free end 37 of the handle on the below the imaginary line TL on the other side thereof. Thus, the handle 36 is shaped so as to reach around the respective sidewall from an inside space of the tire generally between the sidewalls 3, 4 in between which a majority of the tire spreader is located, including the pivotal connections, to an outside of this area. Thus, the handle may not obstruct the working area of interest, which is the inside of the tread, and with the free end 37 located beneath the edge of the sidewall so as to be intermediate same and the tread, the tire spreader may be less susceptible to inadvertent knocking of the tire spreader device out of the locked spreading position to an unlocked condition.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A tire spreader for use with a tire having sidewalls on opposite sides of a tread, the tire spreader comprising:
    a first tire engaging member and a second tire engaging member each supporting a tire engaging element for contacting a respective one of the sidewalls;
    the first and second tire engaging members being pivotally connected to one another at a coupling location so that the tire engaging members can pivot relative to one another from a neutral position, in which the sidewalls are spaced apart at a regular spacing, to a spreading position in which the tire engaging elements are spaced further apart than in the neutral position so as to spread the sidewalls further apart from their regular spacing;
    a first link pivotally connected to the first tire engaging member at an intermediate link location between the tire engaging element thereof and the coupling location;
    a second link pivotally connected to the second tire engaging member at a distal link location spaced from the coupling location in a direction distal to the tire engaging element of the second tire engaging member;
    the second link also being pivotally connected to the first link at a link interconnection location spaced from the intermediate link location where the first link is pivotally connected to the first tire engaging member;
    the second link forming a handle for operating the tire spreader such that upon displacement thereof the distal link location passes from a position on one side of an imaginary line joining the link interconnection location and the coupling location, in the neutral position, to a position on an opposite side with respect to the imaginary line such that the first and second tire engaging members are in the spreading position.

2. The tire spreader according to claim 1 wherein the distal link location is arranged so as to follow a path between the link interconnection location and the coupling location from the neutral position to the spreading position.

3. The tire spreader according to claim 1 wherein the first link is arranged to prevent the distal link location, when on the opposite side of the imaginary line, from further movement away from the imaginary line so as to retain the first and second tire engaging members in the spreading position.

4. The tire spreader according to claim 1 wherein the first link follows a non-linear path from the intermediate link location to the link interconnection location deflecting away from the imaginary line.

5. The tire spreader according to claim 1 wherein, in the neutral position, the handle extends from a portion of the second link which is between the link interconnection location and the distal link location in a direction away from an imaginary line joining the tire engaging elements.

6. The tire spreader according to claim 1 wherein the handle follows a non-linear path from a portion of the second link, which is between the link interconnection location and the distal link location, to a free end of the handle such that, in the spreading position, the handle crosses an imaginary line joining the tire engaging elements from one side thereof on which pivotal connections of the tire spreader are located to the free end of the handle on the other side of the imaginary line.

7. The tire spreader according to claim 1 wherein the second tire engaging member terminates at one end at the distal link location.

* * * * *